United States Patent
Pance et al.

(10) Patent No.: US 9,354,731 B1
(45) Date of Patent: May 31, 2016

(54) MULTI-DIMENSION TOUCH INPUT

(75) Inventors: Aleksandar Pance, Saratoga, CA (US); Philip S. McClendon, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 298 days.

(21) Appl. No.: 13/528,500

(22) Filed: Jun. 20, 2012

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01)

(58) Field of Classification Search
CPC ....... G06F 3/041; G06F 3/0414; G06F 3/044; G06F 3/0487; G06F 2203/04105; G06F 2203/04106
See application file for complete search history.

(56) References Cited

U.S. PATENT DOCUMENTS

| | | | | |
|---|---|---|---|---|
| 6,492,979 | B1 * | 12/2002 | Kent et al. | 345/173 |
| 7,800,044 | B1 * | 9/2010 | Kahn | G06F 1/3287 250/214 AL |
| 2006/0197750 | A1 * | 9/2006 | Kerr et al. | 345/173 |
| 2009/0189866 | A1 * | 7/2009 | Haffenden et al. | 345/173 |
| 2013/0018489 | A1 * | 1/2013 | Grunthaner et al. | 700/73 |
| 2013/0033450 | A1 * | 2/2013 | Coulson et al. | 345/174 |

* cited by examiner

*Primary Examiner* — Kenneth Bukowski
(74) *Attorney, Agent, or Firm* — Polsinelli LLP

(57) ABSTRACT

A computing device can use a combination of input technologies in order to provide for more accurate input determinations, as well as to reduce the number of false inputs determined. A capacitance-sensing approach, which can be self- or mutual-capacitance in nature, can be combined with a force- or pressure-sensing approach. The approaches can share at least some components, such as one or more electrodes, in order to conserve space on the device and reduce cost. An input at one or more locations in one or more modes then can be accepted only if the input is determined to be valid for both approaches, which can prevent false input resulting from keys or other metallic objects being detected by the capacitance components, as well as objects applying pressure to the device as detected by the force sensing components.

21 Claims, 7 Drawing Sheets

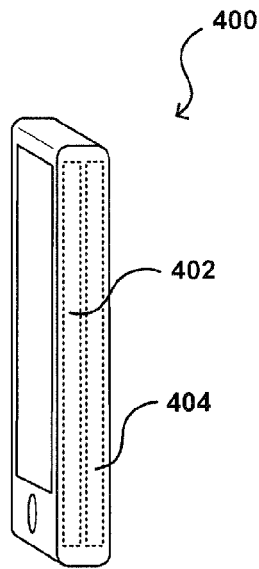 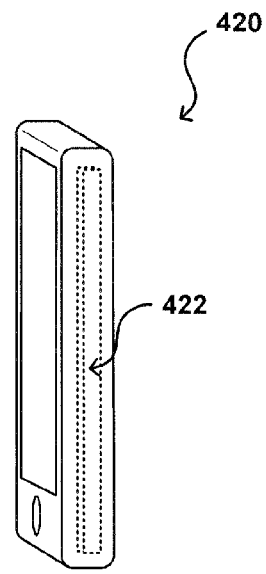 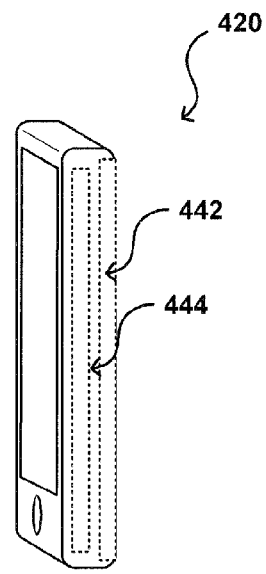
FIG. 4(a)  FIG. 4(b)  FIG. 4(c)
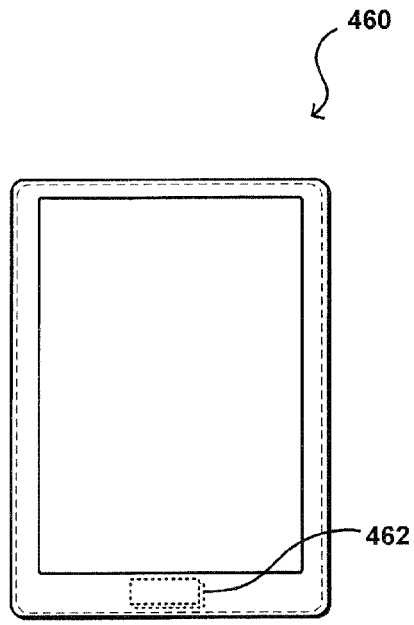 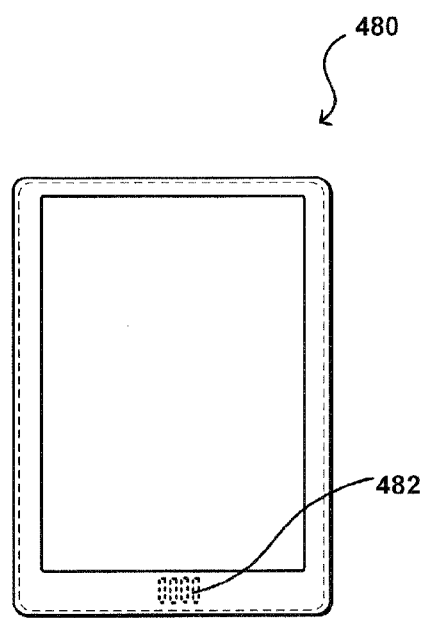
FIG. 4(d)  FIG. 4(e)

MULTI-DIMENSION TOUCH INPUT

BACKGROUND

People are increasingly relying on portable and mobile computing devices for performing various tasks. As these devices become more technologically advanced, and as the appearance of these devices becomes increasingly more important, additional ways of enabling a user to interact with these devices are being investigated. Various devices utilize capacitive touch input to enable a user to press a virtual button or element that does not have a mechanical button mechanism. Unfortunately, when the device comes into contact with a conductive object such as the user's keys, loose change, or other metallic objects, false input can be registered by the device. Similarly, certain device manufacturers are looking at force sensitive resistance (FSR) based input, which enables a user to provide input by applying force or pressure to a location on the device. A similar issue arises with FSR-based input, as the device can have pressure applied by various objects when the device is in a location such as a purse or backpack, thereby potentially causing the device to register false input.

BRIEF DESCRIPTION OF THE DRAWINGS

Various embodiments in accordance with the present disclosure will be described with reference to the drawings, in which:

FIGS. 4(a), 4(b), 4(c), 4(d), and 4(e) illustrate example configurations of components for enabling a user to provide input to a computing device that can be utilized in accordance with various embodiments;

FIG. 5 illustrates an example set of components that can be utilized in a device such as that illustrated in FIG. 1(a).

DETAILED DESCRIPTION

Systems and methods in accordance with various embodiments of the present disclosure may overcome one or more of the aforementioned and other deficiencies experienced in conventional approaches to providing input to, or determining information for, an electronic device. In particular, approaches discussed herein can utilize a combination of input technologies that can be more robust to false input than individual approaches, and that can provide for more accurate input determinations. Certain embodiments use a combination of capacitive and force sensitive input technologies in order to minimize the occurrences of false input in response to an object accidentally or unintentionally contacting the device in a way that might otherwise provide input. For example, using force sensing with capacitive input can prevent keys near a capacitive input from providing false input as long as those keys are not also applying a type of pressure or force that a user would be expected to apply. Similarly, objects such as books and shoes in a book bag can be prevented from providing false input to a device when those objects apply pressure to the device, as those objects generally will not also provide a sufficient change in capacitance. Such an approach can be particularly useful for wake actions or other such functionality.

Many other alternatives and variations are described and suggested below in relation to at least some of the various embodiments.

Figure 1A:
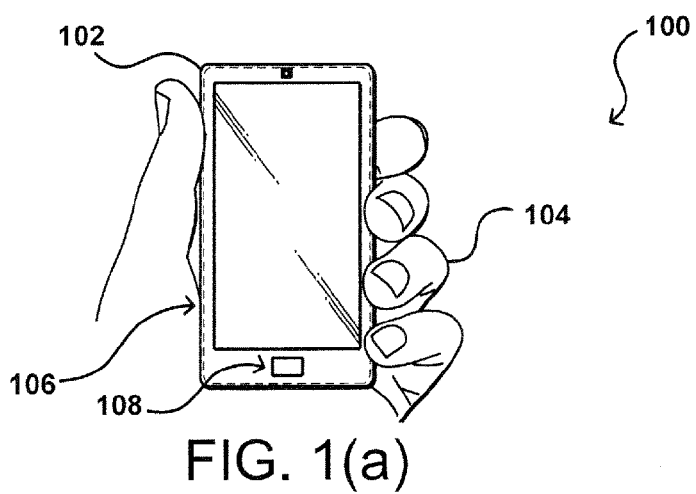
FIGS. 1(a), 1(b), and 1(c) illustrate example ways in which a user can hold, and provide input to, a computing device in accordance with various embodiments.

FIG. 1(a) illustrates an example situation 100 wherein a user is holding a portable computing device 102 in the user's hand 104. The computing device 102 can be any appropriate device, such as a smart phone, tablet computer, or personal data assistant, among other such options. For many of these types of devices, there are various ways in which a user can provide input, such as by pressing one more buttons, touching a touch screen, speaking a voice command, or typing on a keypad, among other such options. Such input mechanisms can be somewhat limiting, however, as they may not be convenient for a user during certain activities. For example, while a user is holding the device to his or her ear during a phone call, the user typically cannot easily access the touchscreen to provide input. If the device has several buttons that can be pressed, the user may not be able to locate the proper button during a call without becoming distracted.

In this example, the computing device 102 has a touch sensitive material 106 around an outer edge of the device. It should be understood, however, that there can be one or more touch sensitive elements at various locations on the device, such as on one or more sides, on the back of the device, on the corners, or at other such locations. The touch sensitive material can include any appropriate material or component, such as multi-touch force-sensitive resistive sensors, capacitive sensors, optical sensors, resistive sensors, pressure sensors, and the like. One specific touch sensitive component can include a force-sensitive resistor (FSR) array touch sensor, which is able to detect an amount of force and/or pressure applied to one or more locations on the device. Another touch detection technology includes capacitive touch technology, which can detect an object in contact with, or in proximity to, a location on the computing device. In FIG. 1(a), there is a virtual button 108 that has capacitive touch elements associated with that location, such that a user can provide input by touching that location even though there is no mechanical button for the user to press.

Figure 1B:
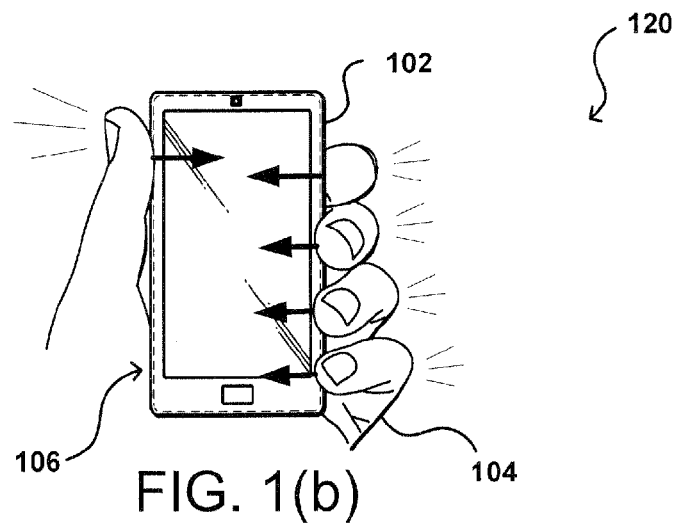

In many cases, a device can allow a user to provide an input to cause the device to perform a function, such as to awaken from a "sleep" or low power state. Various approaches can be used to provide such input. For example, as illustrated for the situation 120 of FIG. 1(b), the user can squeeze the sides of the device 102 with the user's hand, and the applied pressure can be detected by the force sensitive element 106 around at least a portion of the edge of the device. As discussed, however, placing the device in a purse, backpack, or other such location can cause pressure to be applied to the device by various objects when that purse or backpack is moved, which can lead to false positives or inadvertent input. When the pressure is used to wake the device, this can cause the device to potentially power up a number of different times, which can be a significant drain on battery power and can also lead to inadvertent inputs such as pocket dialing for a device such as a smartphone.

Figure 1C:
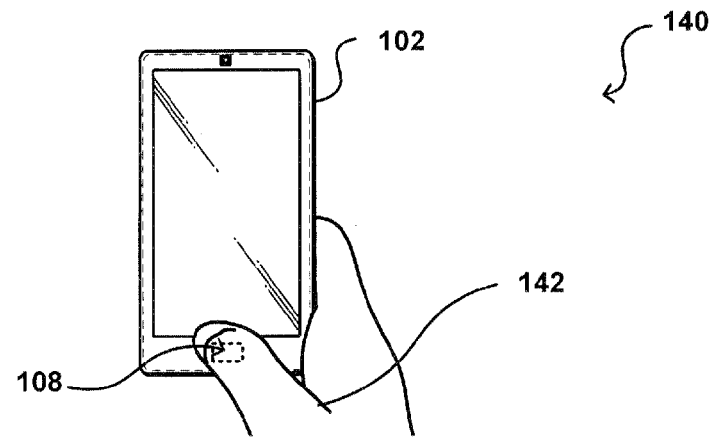

Similarly, FIG. 1(c) illustrates a situation 140 wherein a user is using a thumb 142 to contact a virtual button 108 provided using capacitive sensing technology. If the user places the device in the user's pocket or purse and the device comes into contact or proximity with a conductive object such as a set of keys, the device can potentially detect the object in proximity of the button and wake up the device, which again can waste power and result in potential inadvertent input once the device is in an awake or similar state.

Figure 2A:
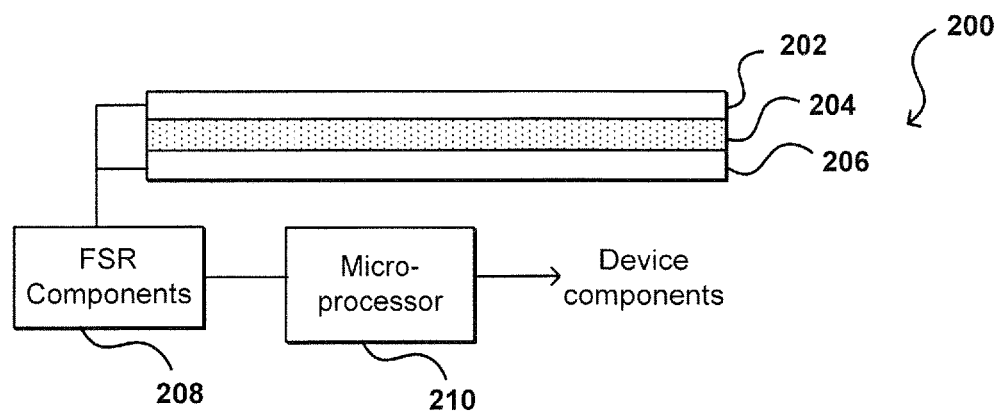
FIGS. 2(a), 2(b), and 2(c) illustrate example components for enabling a user to provide input to a computing device that can be utilized in accordance with various embodiments.
Figure 2B:
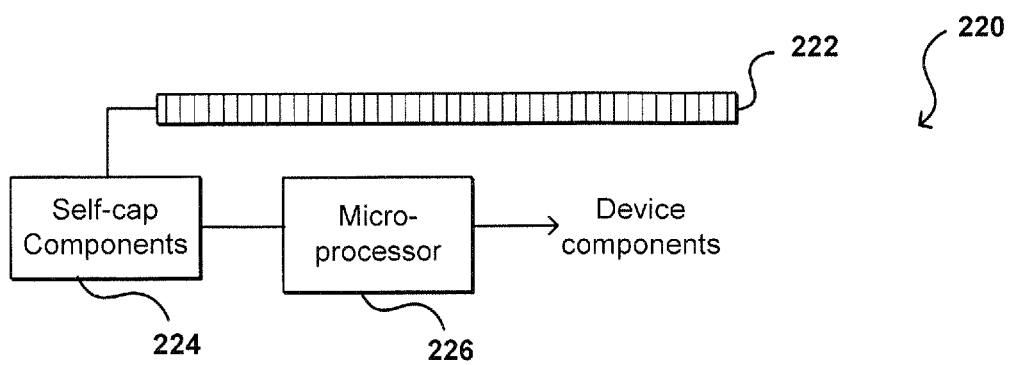
Figure 2C:
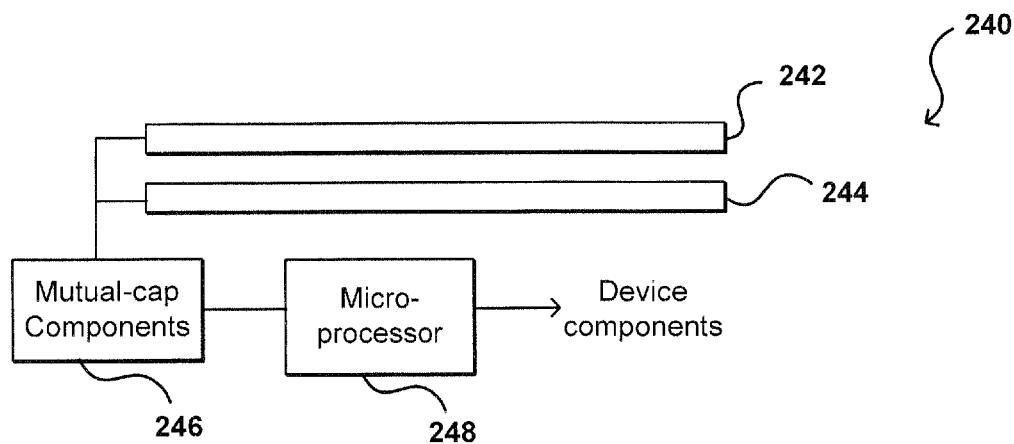

General approaches to providing such technologies are illustrated in FIGS. 2(a) through 2(c). In the view 200 of an example force sensitive resistance (FSR) assembly in FIG. 2(a), a pair of electrodes 202, 206 are shown to be positioned on opposite sides of a deformable layer 204, such as a deformable polymer layer including a number of conductive elements. When the top electrode is pressed by a finger or other such object, the pressure will cause the nearby region of the deformable layer 204 to be compressed, which can cause the conductive elements to touch, or at least come closer to, the electrodes in the adjacent region, which can change the local resistance of the layer. This change in resistance can be detected by one or more FSR components 208, which can provide power, detect changes in resistivity, and perform other such functionality. An advantage over capacitive input is that the FSR determination is not affected if the user is wearing gloves or an insulating material. In at least some embodiments, a microprocessor such as a PIC-class processor can process the detected changes in resistivity from the FSR components and determine whether the changes correspond to an amount, location, pattern, or other criterion or threshold for device input, and if so can provide instructions to other device components, such as an application processor that is able to place the device in an awake state or perform another such action. Approaches for determining an amount of force or pressure applied to a certain location using FSR technology are known in the art and as such will not be discussed in detail herein. Further, specific FSR implementations such as interpolating force-sensitive resistance (IFSR) implementations can be used as well within the scope of the various embodiments.

FIG. 2(b) illustrates a view 220 of components that can be used to determine the proximity of an object using a self-capacitance approach that can be used in accordance with various embodiments. In this example, single layer 222 or sheet of electrode elements is connected to capacitance-sensing circuitry and other components 224 that are able to determine a change in capacitance at one or more locations on the device, and provide that information to a microprocessor 226 operable to determine whether the change meets an input criterion or threshold, and if so can provide data to other device components as discussed above. FIG. 2(c) illustrates a view 240 of basic mutual-capacitance components. In this example, there are two electrode layers 242, 244, one of which provides the driving current and the other of which senses the current at various locations. Capacitance sensing components 246 can detect the changes due to various objects in proximity to the electrodes, and can provide data for the changes to a microprocessor as discussed above. Various approaches to determining input using self- or mutual-capacitance sensing technologies are known in the art and, as such, will not be discussed herein in detail.

Capacitance sensing and force sensing approaches complement each other, as they measure different aspects of an appropriate touch input from a user. For example, the force or pressure applied by a human's finger can be one indication of attempted input, and the ability to detect a corresponding change in capacitance can help to determine that the pressure or force was actually applied by a human finger or other such object.

Figure 3A:
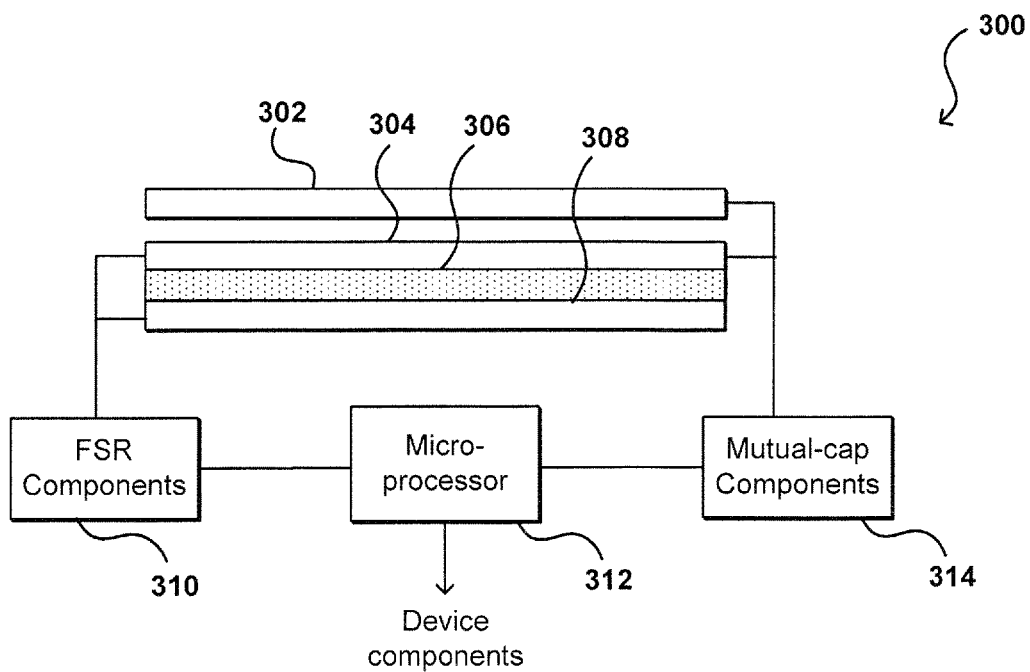
FIGS. 3(a) and 3(b) illustrate example components for enabling a user to provide input to a computing device that can be utilized in accordance with various embodiments.
Figure 3B:
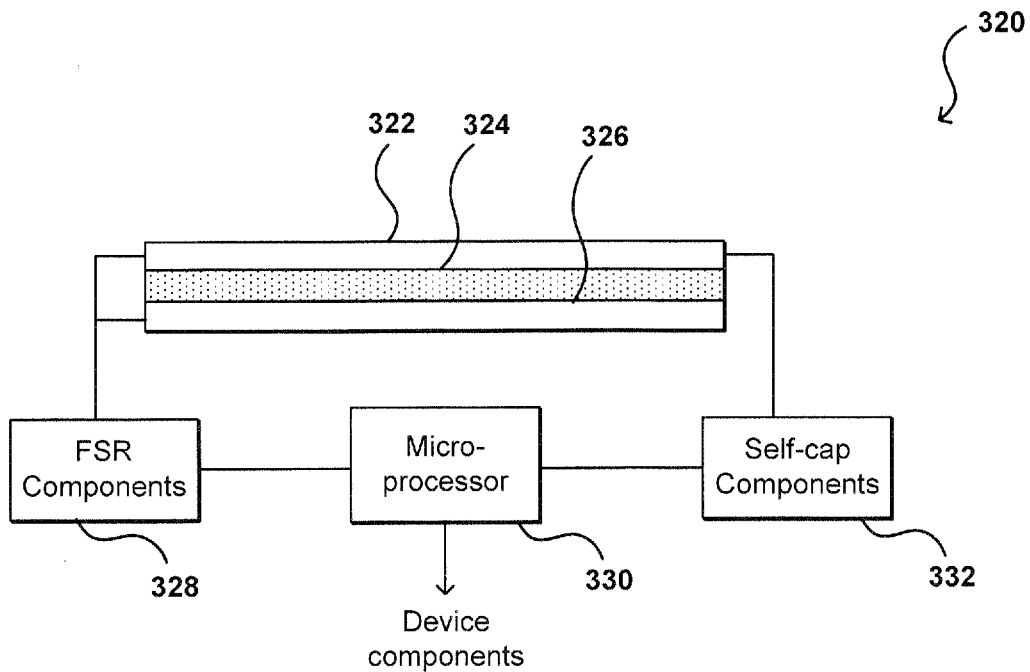

Approaches in accordance with various embodiments attempt to utilize a combination of these and other such techniques to provide for accurate touch input that is more robust to false input than conventional approaches. In some embodiments, as discussed later herein, components for FSR and capacitive sensing input can be positioned near to each other such that both technologies can register an input from a user at one or more locations on a device. As illustrated in FIGS. 3(a) and 3(b), however, various embodiments can attempt to combine the approaches in such a way as to share one or more components, which can save costs and volume, both of which can be particularly important for small portable or mobile devices.

For example, the view 300 of FIG. 3(a) illustrates a situation where FSR and mutual capacitance approaches share an electrode 304, with the capacitance approach measuring the capacitance with respect to the top electrode 302 and the FSR measuring resistance changes in the deformable layer 306 with respect to the lower electrode 308. Other such configurations can be utilized as well, such as where the capacitance components share the bottom electrode of the FSR device. In this example, the FSR components 312 and mutual capacitance components 314 are separate, but it should be understood that these can be part of a common set of components in some embodiments. In order for the shared electrode 304 to be used for both approaches, a microprocessor 312 or other such components can utilize time-domain multiplexing, or another such approach, to ensure that the electrode 304 is only being used for one approach or the other at any given time, and that the electrode properly alternates between the two roles. For example, the shared electrode can be powered appropriately for force sensing, and allowed to float for capacitive sensing. The rate at which the role switches can vary and/or be configurable, such as by a user, application, manufacturer, or other such entity. The rate at which roles change also can be affected by aspects such as a current state of the device, remaining amount of battery power, and other such factors. In some embodiments, a transistor such as a field-effect transistor (FET) can be used to provide isolation between the two technologies.

FIG. 3(b) illustrates a view 320 of a similar situation, except here the self-capacitance approach utilizes a single electrode layer 322, which in the other role serves as the top electrode for the deformable layer 324 and bottom electrode 326 of the FSR approach. Again the FSR components and self-capacitance components can be controlled, managed, or triggered by a device such as a microprocessor 330 in order to ensure proper time-domain multiplexing of the use of the shared electrode layer 322.

FIG. 4(a) illustrates a first configuration 400 that can be used in accordance with various embodiments. In this example there are side-by-side electrodes, one set 402 for the force-sensing components and one or more electrodes 404 for the capacitance sensing. Although the electrodes are shown to run along an edge of the device, it should be understood that any number of electrodes can be positioned at any appropriate locations on the device, such as the front, back, corners, sides, etc. Such an approach avoids having to do time-domain multiplexing, and thus can be less complicated, but also takes up more real estate of the device. In the view 420 of FIG. 4(b) the electrodes are stacked and shared as described with respect to FIGS. 3(a) and 3(b). Again, any number of these electrodes can be placed at any appropriate locations on the device. Such an approach can more accurately detect small and precise touches, and take up less space, but also can require a more complex control and/or analysis algorithm so ensure that any shared components are operated and/or analyzed properly. In the view 440 of FIG. 4(*c*), the capacitive electrodes 442 are positioned near the back of the device to detect when a user is holding the device, and the FSR electrodes 444 are positioned at another location on the device. It should be understood that in other embodiments the FSR electrodes can be positioned on the back to detect a user holding the device, with the capacitance electrodes positioned elsewhere, among other such options.

FIGS. 4(*d*) and 4(*e*) illustrate analogous configurations 460, 480 of a device, such as a table computer, except that the touch region is a virtual button instead of a side or location on the device. In the view 460 of FIG. 4(*d*), the electrodes 462 are stacked in order to allow for sharing and provide a more accurate detection. In the view 480 of FIG. 4(*e*), the electrodes 482 are placed side by side, and in this case interleaved, such that a time-sharing manager is not needed. Various other layouts and configurations can be used as well within the scope of the various embodiments.

Figure 5:
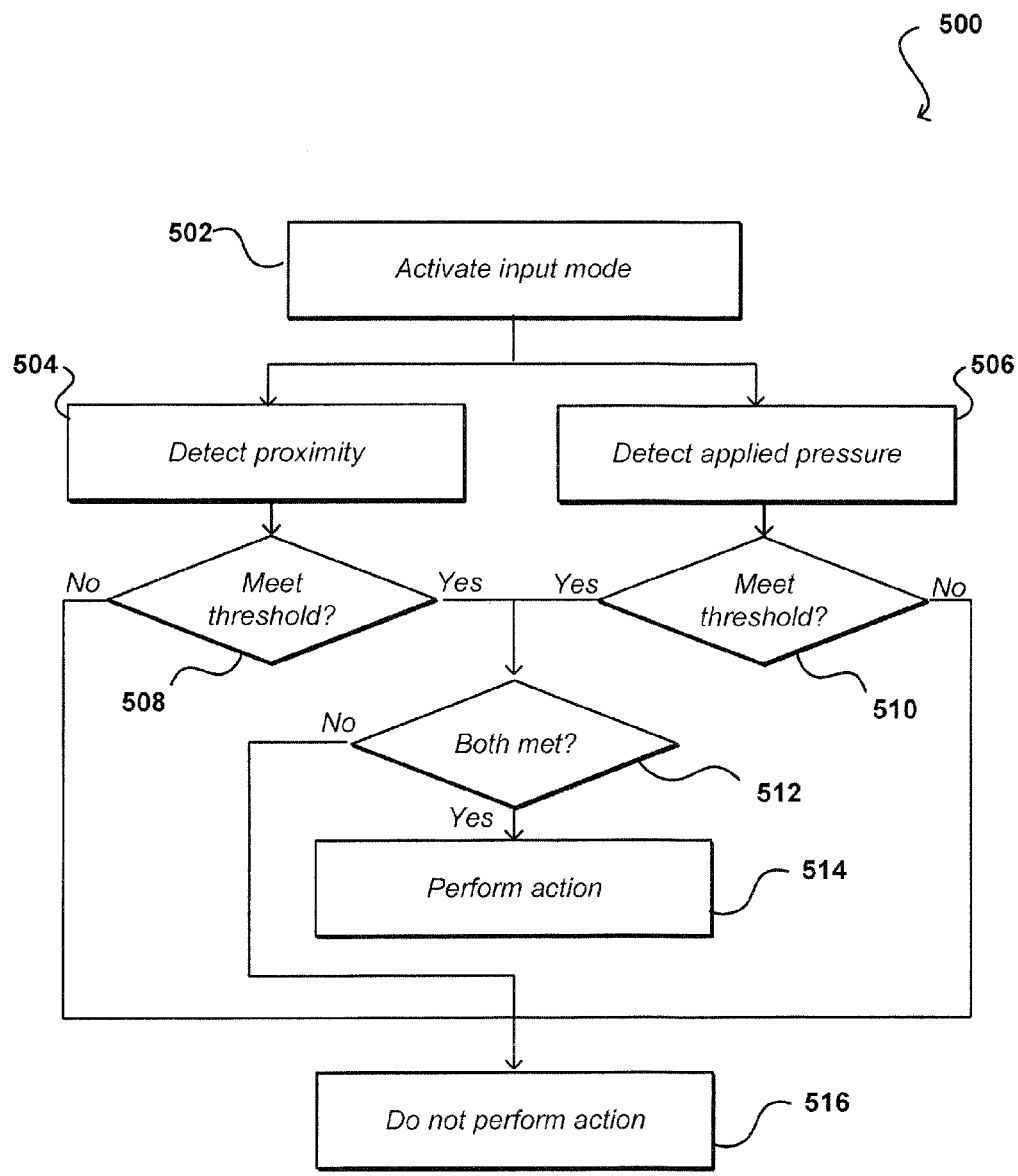
FIG. 5 illustrates an example process for determining input that can be utilized in accordance with various embodiments.

FIG. 5 illustrates an example process 500 for determining a touch input that can be utilized in accordance with various embodiments. It should be understood, however, that there can be additional, fewer, or alternative steps performed in similar or alternative orders, or in parallel, within the scope of the various embodiments unless otherwise stated. In this example, an input mode is activated 502 on the device, enabling touch, press, slide, or other such input to be provided at one or more locations on the computing device. At the same or different times, as discussed herein, the device can attempt to detect 504 a proximity of an object and detect 506 an applied pressure at one of the determined locations. If neither of these detected actions is determined 508, 510 to at least meet a respective threshold, such as a minimum amount of capacitance change or minimum amount of change in resistance, then the actions can be determined to not correspond to valid input, and no action can be taken 516. If only one of the actions meets such a threshold, then no action can be taken. If both are determined 512 to meet a respective threshold, then a corresponding action can be taken. As discussed, this can include waking up the device, unlocking the device, or performing another such action.

Figure 6:
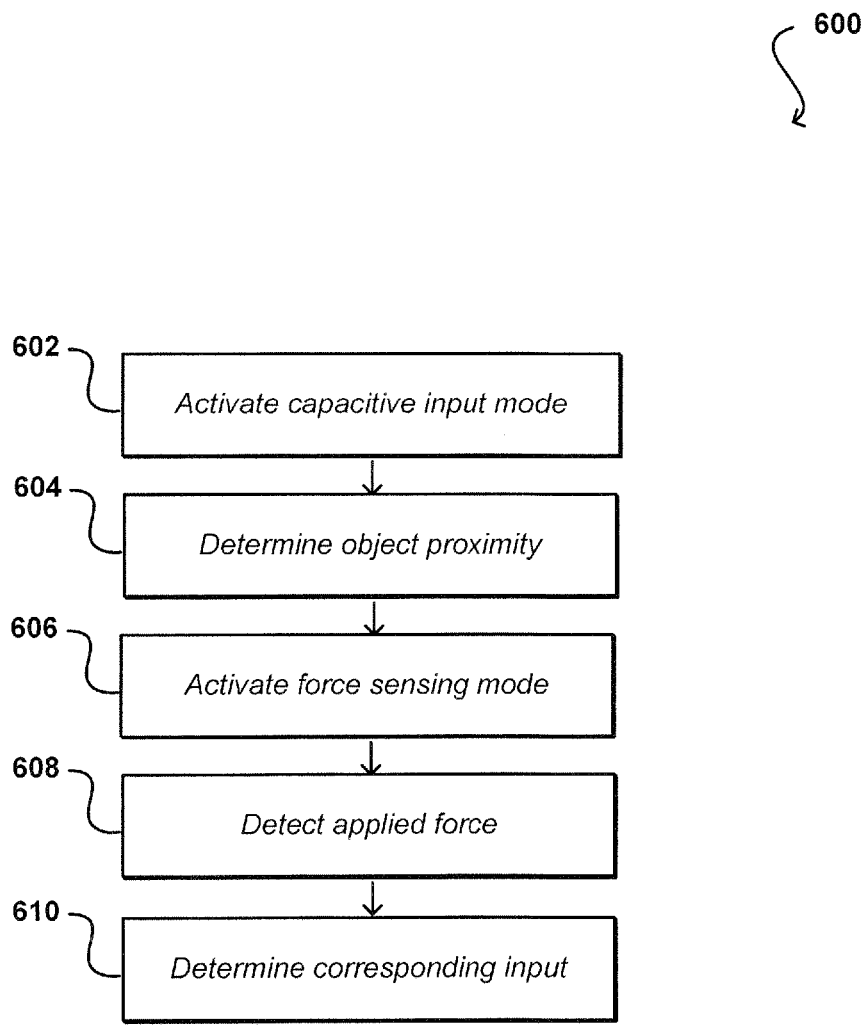
FIG. 6 illustrates another example process for determining input that can be utilized in accordance with various embodiments.

In some embodiments, as discussed herein, only one of the approaches might be activated initially in order to conserve power. FIG. 6 illustrates one such example process 600 that can be used in accordance with various embodiments. In this example process, capacitance input mode is activated 602 initially, although as discussed FSR or another mode might be activated initially in other embodiments. If the proximity of an object to an input location is detected 604, a force sensing mode can be activated 606 as well. As discussed, depending on the configuration the modes can operate concurrently or can alternate operational states. If a corresponding applied force is detected 608 at that input location, the corresponding input can be determined 610 and provided to the appropriate processor, application, or other component of the computing device. Various other combinations and uses can exist as well within the scope of the various embodiments. In some embodiments, the device (or software in communication with the device) can monitor the user's usage patterns and determine which mode to activate when. For example, if a user usually puts a smart phone in a pocket and has the most false positives from keys or coins then FSR might be activated initially to reduce the number of times that false input needs to be analyzed. Similarly, if a user typically throws a tablet computer in a backpack where pressure is the main source of false input, capacitive touch might be activated by default. Various other such determinations can be utilized as well within the scope of the various embodiments.

As mentioned, combining these technologies in such a way can enable very low power operation and longer battery life for devices such as mobile devices, as a mobile device can use the lower power input device (for example, proximity sensing based on capacitive technology) to enable the force sensitive components, while still keeping the rest of the system in a sleep mode, and only waking up the system when both approaches detect valid input. Elimination of false triggers will necessarily yield better battery life. In other modes of operation, either one or both input modes can be used to provide different levels of functionality to the device.

As discussed, other combinations can be utilized as well. For example, capacitive sensing can be used with any type of mechanical control, such as a button, keypad, or slider. The device might have to detect an appropriate change in capacitance in order to determine that the activation or operation of any of these mechanical controls corresponds to activation by a human, and not inadvertent input from an inanimate object, etc.

Figure 7:
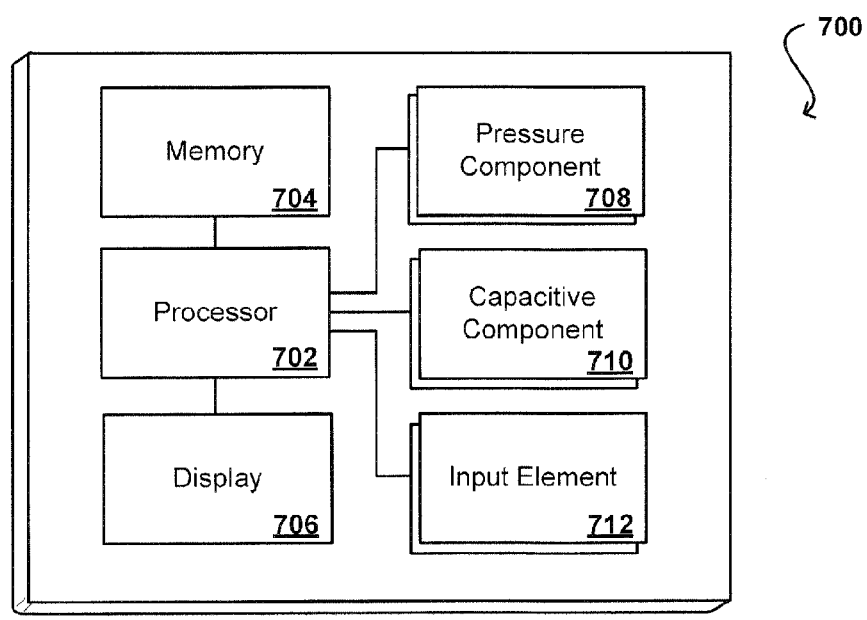

Although a portable computing device (e.g., an electronic book reader or tablet computer) is illustrated in many examples, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. FIG. 7 illustrates a logical arrangement of a set of general components of such a computing device. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments can include one or more audio and/or video components for capturing and/or presenting audio and/or video content. Such components can include at least one image capture element such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 700 includes one or more force and/or pressure sensing components or sub-systems 708, such as may include a force-sensitive resistance material over one or more regions of the device. In some embodiments a dedicated pressure processor and/or chip can be utilized that can provide input to a main processor of the device. The device also can include one or more capacitance sensing components 710, in self or mutual capacitance mode, in accordance with various embodiments.

The computing device 700 of FIG. 7 can include one or more communication elements or networking sub-systems, such as a Wi-Fi, Bluetooth, RE, wired, or wireless communication system. The device in many embodiments can communicate with a network, such as the Internet, and may be able to communicate with other such devices. In some embodiments the device can include at least one additional input device 712 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device also can include at least one orientation or motion sensor (not shown). Such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor, whereby the device can perform any of a number of actions described or suggested herein.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    determining a physical environment in which a computing device is situated;
    determining from the physical environment that a capacitance sensor of the computing device is more prone to false inputs than a force-sensitive resistor of the computing device;
    deactivating a display of the computing device and the capacitance sensor;
    detecting, using the force-sensitive resistor, that an amount of force applied to a location on the computing device satisfies a first input threshold;
    activating the capacitance sensor;
    detecting, using the capacitance sensor, that a change in capacitance, corresponding to an object brought within a detectable proximity of the location, satisfies a second input threshold;
    activating the display; and
    performing an action on the computing device corresponding to the amount of force and the change in capacitance,
    wherein the force-sensitive resistor and the capacitance sensor utilize at least one common electrode with power to the at least one common electrode being applied differently for detecting the amount of force than for detecting the change in capacitance.

2. The computer-implemented method of claim 1, wherein the capacitance sensor is at least one of a self-capacitance sensor or a mutual-capacitance sensor.

3. The computer-implemented method of claim 1, wherein the force-sensitive resistor is positioned adjacent the capacitance sensor on the computing device.

4. The computer-implemented method of claim 1, further comprising:
    managing operation of the force-sensitive resistor and the capacitance sensor such that the at least one common electrode is only utilized by either the force-sensitive resistor or the capacitance sensor at any time.

5. The computer-implemented method of claim 1, wherein the detectable proximity includes physical contact.

6. A computer-implemented method, comprising:
    determining from contextual data received to a computing device that a capacitance sensor of the computing device is more prone to false inputs than a force sensor of the computing device;
    deactivating a display of the computing device and the capacitance sensor;
    determining from the force sensor that an amount of force, applied to a region of the computing device, satisfies a force input threshold;
    activating the capacitance sensor;
    determining from the capacitance sensor that a change in capacitance, near the region, satisfies a capacitance input threshold;
    activating the display; and
    performing an action on the computing device corresponding to the amount of force and the change in capacitance;
    wherein the computing device includes at least one common electrode with power to the at least one common electrode being applied differently for determining the amount of force applied than for determining the change in capacitance.

7. The computer-implemented method of claim 6, wherein the force sensor includes least one force-sensitive resistance component.

8. The computer-implemented method of claim 7, wherein the computing device contains a plurality of additional force-sensitive resistance components at additional regions on the computing device.

9. The computer-implemented method of claim 6, wherein the capacitance sensor includes at least one of a self-capacitance sensing element or a mutual-capacitance sensing element.

10. The computer-implemented method of claim 6, wherein the region is located at one of a side, top, bottom, corner, back, or periphery of the computing device.

11. The computer-implemented method of claim 6, further comprising:
    determining a type of motion corresponding to the amount of force applied, the type of motion including at least one of a press, a swipe, or a slide.

12. The computer-implemented method of claim 6, wherein a type of input to the computing device corresponds to a type of motion.

13. A computer-implemented method, comprising:
    determining from contextual data received to a computing device that a force sensor of the computing device is more prone to false inputs than a capacitance sensor of the computing device;
    deactivating a display of the computing device and the force sensor;
    detecting from the capacitance sensor that a change in capacitance, near a location on the computing device, satisfies a capacitance input threshold;
    activating the force sensor;
    detecting from the force sensor that an amount of force, applied to the location, satisfies a force input threshold;
    activating the display; and
    performing an action on the computing device corresponding to the amount of force, and the change in capacitance,
    wherein the force sensor and the capacitance sensor utilize at least one common electrode with power to the at least one common electrode being applied differently for detecting the amount of force than for detecting the change in capacitance.

14. The computer-implemented method of claim 13, wherein the action corresponds to a change of a state of the computing device.

15. The computer-implemented method of claim 13, wherein the location near which the change in capacitance is detected is on a back of the device.

16. A computing device comprising:
    a processor;
    a display;
    a force sensor;
    a capacitance sensor; and
    a memory device including instructions that, when executed by the processor, cause the computing device to:
        determine from contextual data received to the computing device that the capacitance sensor is more prone to false inputs than the force sensor;
        deactivate the display and the capacitance sensor;

determine from the force sensor that an amount of force applied to a region of the computing device satisfies a force input threshold;

activate the capacitance sensor;

determine from the capacitance sensor that a change in capacitance, near the region, satisfies a capacitance input threshold;

activate the display; and perform an action on the computing device corresponding to the amount of force and the change in capacitance, wherein the force sensor and the capacitance sensor utilize at least one common electrode with power to the at least one common electrode being applied differently for determining the amount of force than for determining the change in capacitance.

17. The computing device of claim 16, wherein the capacitance sensor is at least one of a self-capacitance sensor or a mutual-capacitance sensor.

18. The computing device of claim 16, further comprising:

a control component configured to manage a time sharing of the at least one common electrode by the capacitance sensor and the force sensor.

19. A non-transitory computer-readable storage medium storing instructions that, when executed by at least one processor of a computing device, cause the computing device to:

determine from contextual data received to a computing device that a capacitance sensor of the computing device is more prone to false inputs than a force sensor of the computing device;

deactivate a display of the computing device and the capacitance sensor;

determine from the force sensor that an amount of force applied to a region of the computing device satisfies a force input threshold;

activate the capacitance sensor;

determine from the capacitance sensor that a change in capacitance, near the region, satisfies a capacitance input threshold;

activate the display; and perform an action on the computing device corresponding to the amount of force and the change in capacitance, wherein the computing device includes at least one common electrode with power to the at least one common electrode being applied differently for determining the amount of force than for determining the change in capacitance.

20. The non-transitory computer-readable storage medium of claim 19, wherein the force sensor includes at least one force-sensitive resistance component.

21. The non-transitory computer-readable storage medium of claim 19, wherein the capacitance sensor includes at least one of a self-capacitance sensing element or a mutual-capacitance sensing element.

* * * * *